United States Patent
Cohen et al.

(10) Patent No.: US 11,252,876 B2
(45) Date of Patent: Feb. 22, 2022

(54) SYSTEM AND METHOD FOR TREE GROWTH MANAGEMENT

(71) Applicant: TREE-TUBE LTD., Kfar Azar (IL)

(72) Inventors: Ron Cohen, Kfar Azar (IL); Yehonatan Antebi, Herzeliya (IL); Jacob Eilon, Kfar Sava (IL); Shachar Zur, Tel Aviv (IL)

(73) Assignee: TREE-TUBE LTD., Kfar Azar (IL)

( * ) Notice: Subject to any disclaimer, the term of this patent is extended or adjusted under 35 U.S.C. 154(b) by 163 days.

(21) Appl. No.: 16/644,044

(22) PCT Filed: Sep. 4, 2018

(86) PCT No.: PCT/IL2018/050984
§ 371 (c)(1),
(2) Date: Mar. 3, 2020

(87) PCT Pub. No.: WO2019/043720
PCT Pub. Date: Mar. 7, 2019

(65) Prior Publication Data
US 2020/0404861 A1    Dec. 31, 2020

Related U.S. Application Data

(60) Provisional application No. 62/553,948, filed on Sep. 4, 2017.

(51) Int. Cl.
*A01G 9/04*    (2006.01)

(52) U.S. Cl.
CPC .................................. *A01G 9/047* (2013.01)

(58) Field of Classification Search
CPC ........ A01G 9/047; A01G 29/00; A01G 25/00; E02B 11/00; E02B 11/005; E02B 13/00; E02B 13/02
See application file for complete search history.

(56) References Cited

U.S. PATENT DOCUMENTS

| 855,652 | A | * | 6/1907 | Mori | E02B 11/005 405/43 |
| 3,878,685 | A | | 4/1975 | Schmunk | |
| 4,140,422 | A | * | 2/1979 | Crumpler, Jr | F16L 37/248 405/49 |

(Continued)

FOREIGN PATENT DOCUMENTS

| DE | 3202684 | 8/1983 |
| EP | 0019705 | 12/1980 |

(Continued)

OTHER PUBLICATIONS

International Search Report and Written Opinion of the Searching Authority, International Application No. PCT/IL2018/050984, dated Nov. 20, 2018.

*Primary Examiner* — Kristen C Hayes
(74) *Attorney, Agent, or Firm* — The Roy Gross Law Firm, LLC; Roy Gross

(57) ABSTRACT

A system having an elongated body defining a hollow passageway therethrough, which includes as a first opening disposed about a longitudinal upper half of the elongated body, and at least two second openings disposed about longitudinal side zones of the elongated body, wherein each of the at least two second opening has an area of between 80 and 700 cm².

20 Claims, 12 Drawing Sheets

(56) References Cited

U.S. PATENT DOCUMENTS

| | | | |
|---|---|---|---|
| 4,950,103 A | 8/1990 | Justice | |
| 7,661,903 B1 | 2/2010 | Maroschak et al. | |
| 10,240,332 B1 * | 3/2019 | Stetson | E02B 11/005 |
| 2002/0172557 A1 * | 11/2002 | Chen | E02B 11/005 |
| | | | 405/43 |
| 2005/0100412 A1 * | 5/2005 | Houck | E03F 3/046 |
| | | | 405/124 |
| 2010/0119305 A1 * | 5/2010 | Rosinbaum | E03F 3/046 |
| | | | 405/43 |
| 2013/0014436 A1 | 1/2013 | Shepps | |
| 2016/0160487 A1 | 6/2016 | Wynne | |
| 2018/0209132 A1 * | 7/2018 | Dian | E01C 11/227 |
| 2018/0235158 A1 | 8/2018 | Iorio | |
| 2020/0080269 A1 * | 3/2020 | Schletzbaum | E02B 11/005 |

FOREIGN PATENT DOCUMENTS

| | | | | |
|---|---|---|---|---|
| FR | 2494556 A1 * | 5/1982 | | A01G 29/00 |
| JP | 2007060981 | 3/2007 | | |
| KR | 20090000187 | 1/2009 | | |
| KR | 20090000187 U | 1/2009 | | |
| KR | 20130015487 | 2/2013 | | |
| KR | 20130015487 A | 2/2013 | | |
| KR | 101440988 B1 | 9/2014 | | |
| WO | WO-2015108212 A1 * | 7/2015 | | E03F 3/046 |
| WO | 2017044920 | 3/2017 | | |

* cited by examiner

SYSTEM AND METHOD FOR TREE GROWTH MANAGEMENT

CROSS-REFERENCE TO RELATED APPLICATIONS

This application is a National Phase of PCT Patent Application No. PCT/IL2018/050984 having International filing date of Sep. 4, 2018, which claims the benefit of priority from of U.S. Provisional Patent Application No. 62/553,948, filed on Sep. 4, 2017. The contents of the above applications are all incorporated by reference as if fully set forth herein in their entirety.

FIELD OF THE INVENTION

This invention relates to the field of management of tree growth.

BACKGROUND

Trees offer significant economic, social, and environmental benefits to the urban environment. Among other benefits, trees beautify the streetscape, offer shade foliage for pedestrians, intercept and absorb air pollution, help combat the effects of urban heat islands, and provide wildlife habitat. However, successfully growing trees in a dense urban environment presents several challenges. For trees to develop into mature plants, they must be provided with sufficient high-quality soil, adequate moisture, and efficient soil drainage. Lack of adequate soil volume, and poor irrigation and ventilation in the subsoil, are among the main causes of street tree decline.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a system comprising an elongated body defining a hollow passageway therethrough, said elongated body having (i) a length of between 100 and 800 cm, and (ii) a cross-sectional perimeter dimensioned such that a maximal inscribed circle within said cross-sectional perimeter has a diameter of between 50 and 300 cm, wherein said elongated body comprises: a first opening disposed about a longitudinal upper half of said elongated body, wherein said first opening has an area of between 300 and 20000 $cm^2$; and at least two second openings disposed about at least one of: (a) a first longitudinal side zone of said elongated body which extend clockwise from about the 1-o'clock position to about the 5-o'clock position on said inscribed circle, and (b) a second longitudinal side zone of said elongated body which extends clockwise from about the 7-o'clock position to the 11-o'clock position on said inscribed circle, wherein each of said at least two second opening has an area of between 20 and 700 $cm^2$.

There is also provided, in accordance with an embodiments, a method for tree-growth management, comprising the steps of: providing a system comprising an elongated body defining a hollow passageway therethrough, said elongated body having (i) a length of between 100 and 800 cm, and (ii) a cross-sectional perimeter dimensioned such that a maximal inscribed circle within said cross-sectional perimeter has a diameter of between 50 and 300 cm, wherein said elongated body comprises: a first opening disposed about a longitudinal upper half of said elongated body, wherein said first opening has an area of between 300 and 20000 $cm^2$; and at least two second openings disposed about at least one of: (a) a first longitudinal side zone of said elongated body which extend clockwise from about the 1-o'clock position to about the 5-o'clock position on said inscribed circle, and (b) a second longitudinal side zone of said elongated body which extends clockwise from about the 7-o'clock position to the 11-o'clock position on said inscribed circle, wherein each of said at least two second opening has an area of between 20 and 700 $cm^2$; deploying said elongated body below surface such that said first opening is oriented substantially upwards; and planting a plant through said first opening.

In some embodiments, said elongated body comprises two or more said first openings disposed about said longitudinal upper half of said elongated body, and wherein said two or more first openings are spaced at least 300 cm center-to-center.

In some embodiments, said system further comprises a planting extension comprising a hollow conduit configured for coupling to said first opening and extending perpendicularly from a top surface of said elongated body, wherein said planting extension has a length of between 5 and 60 cm. In some embodiments, said method further comprises (i) deploying said elongated body such that (a) said first opening is oriented substantially upwards, and (b) an upper end of said planting extension is substantially at surface level; and (ii) said planting comprises planting a plant through said planting extension.

In some embodiments, said elongated body comprises between 3 and 10 said second openings arranged about at least one of said first and second longitudinal side zones.

In some embodiments, said elongated body further comprises at least one third opening disposed about a longitudinal bottom zone of said elongated body which extends clockwise from about the 5:30-o'clock position to about the 6:30-o'clock position on said inscribed circle, wherein said at least one third opening has an area of between 80 and 500 $cm^2$.

In some embodiments, said elongated body further comprises at least one fourth opening disposed about a longitudinal top zone of said elongated body which extends clockwise from about the 11:30-o'clock position to about the 12:30-o'clock position on said inscribed circle, wherein said at least one fourth opening has an area of between 1 and 12 $cm^2$.

In some embodiments, said system further comprises two or more said elongated bodies, wherein each of said elongated bodies is configured for coupling to one or more other said elongated bodies.

In some embodiments, said coupling is selected from the group consisting of: end-to-end coupling, end-to-side coupling, and side-to-side coupling.

In some embodiments, said coupling has an angle selected from the groups consisting of: a straight angle, a right angle, an obtuse angle, and an acute angle.

In some embodiments, said two or more elongated bodies are interconnected to form a layout comprising one or more of a straight line, a curved line, a circle, a rectangle, a T-junction, an L-junction, and an H-pattern. In some embodiments, said method further comprises (i) interconnecting two or more of said plurality of said elongated bodies to form a layout comprising one or more of a straight line, a curved line, a circle, a rectangle, a T-junction, an L-junction, and an H-pattern, and (ii) deploying said layout below surface such that each of said first openings of each of said elongated bodies is oriented substantially upwards.

In some embodiments, said elongated body has a cross-sectional profile selected from the group consisting of: a circle, an oval, an octagon, a horseshoe shape, and a rectangle.

In some embodiments, said elongated body is curved. In some embodiments, said elongated body is bent at one or more points, and wherein each of said bends has an angle selected from the group consisting of: a straight angle, a right angle, an obtuse angle, and an acute angle.

In some embodiments, said elongated body is made of one or more materials selected from the group consisting of: a polymer, polyethylene, polypropylene, a polyolefin, cast iron, black iron, steel, and concrete.

In some embodiments, said elongated body is capable of supporting a load of at least 10 tons.

In some embodiments, said elongated body has a corrugated construction. In some embodiments, said corrugated construction comprises an inner wall and an outer wall, wherein said outer wall defines a plurality of successive spaced-apart annular ribs with annular valley-defining portions between each pair of said annular ribs, and wherein each of said annular ribs defines a corresponding annular hollow channel formed interiorly thereof.

In some embodiments, said annular ribs are helically-formed about the elongated body.

In some embodiments, said elongated body further comprises a plurality of perforations extending axially and circumferentially about the inner wall of said elongated body, and wherein each of said plurality of perforations has an area of between 1 and 5 $cm^2$ In some embodiments, each of said perforations penetrates said inner wall of the elongated body to enable air communication between an interior of said elongated body and one of said annular hollow channels.

In some embodiments, each of said fourth openings is disposed about a crown of one of said plurality of annular ribs to provide air communication between said corresponding annular hollow channel and the ambient atmosphere.

In some embodiments, said system further comprises at least one aeration shaft connected to each of said fourth openings, wherein said aeration shaft has a length of between 5 and 60 cm. In some embodiments, said method further comprises deploying said elongated body such that said at least one aeration shaft is at least at surface level In some embodiments, a ratio between said area of said first opening and said area of said second opening is between 1.5:1 and 4:1.

In some embodiments, a total area of all openings and perforations in said elongated body is equal to between 6% and 25% of a total surface area of said elongated body.

In some embodiments, said system further comprises an interconnecting means for connecting said elongated body to a ground anchor, wherein said interconnecting means comprise one or more brackets comprising eyes. In some embodiments, said method further comprises (i) installing said ground anchor, and (ii) connecting said ground anchor to said interconnecting means.

In some embodiments, said system further comprises at least one stabilizer fin disposed about an outer wall of said elongated body and extending perpendicularly outwardly therefrom.

In some embodiments, said system further comprises a conduit disposed longitudinally within said elongated body and having a plurality of perforations along its length. In some embodiments, said conduit comprises an irrigation element. In some embodiments, said irrigation element is a drip irrigation element. In some embodiments, said conduit further comprises a layer of geotextile fabric disposed along its length.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are a system and method for managing plant growth in an urban and/or similar environments. In some embodiments, the present invention provides for a suitable growth environment for trees or other large plants and vegetation in the vicinity of built-up hardscape, infrastructure, and/or similar load-bearing surfaces, such as curbs, sidewalks, pavements, and/or roadways.

Figure 1:
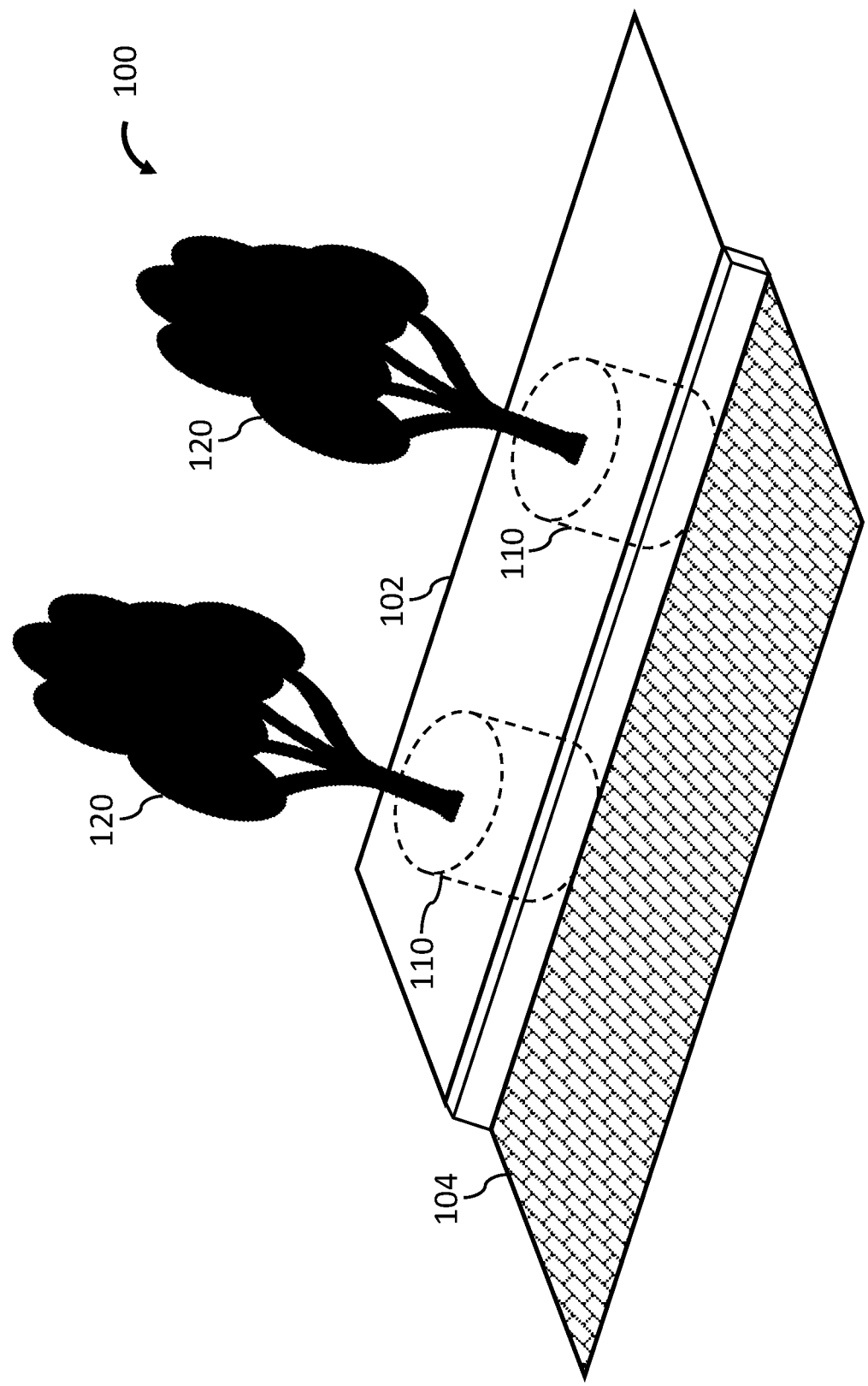
FIG. 1 is an illustration of a common open pit planting system.

The design of many urban landscapes often calls for the planting of trees, e.g., alongside streets, pavements and walkways, so that the benefits of the trees can be enjoyed by pedestrians using these features. For example, with reference to FIG. 1, a common urban tree planting practice provides for a series of open pits 110, which may be dug pits or cavities containing compacted soil for supporting surrounding load-bearing hardscape, such as curb 102 and roadway 104. However, trees and similar large plants, such as trees 120, rely on sending forth an extensive root system in search of nutrients and water. Compacted soil, which is often also nutrient-deficient and may be contaminated, stunts the growth of the root system and the development of the tree. In addition, there is a direct relationship between the size of the tree (in terms of both crown diameter and trunk diameter) and the soil volume required for healthy growth.

As a result, trees planted within an urban environment in a limited volume of compacted soil may fail to grow to their full potential, and may even die prematurely. In addition, the permanent, rigid hardscape structures in place make it difficult to maintain and augment the contents of the tree growth space. In some cases, inadequate growing conditions may also result in damage to the surrounding hardscape. For example, tree roots typically occupy a relatively shallow zone in the soil, but may extend outwardly well beyond the drip line of the tree. As a tree grows, lack of adequate growth space may lead the roots to extend under the hardscape and cause, e.g., buckling and upheaval of sidewalks and roadways. Roots may also interfere with utility lines running underneath the hardscape.

Below Surface

Controlling storm water run-off is another problem in dense urban areas with compacted soil. Successful control of storm water should permit for the efficient draining-off of storm water with disposal into the ground. As density increases, the areas that can be devoted to storm water management decrease because of paving or buildings.

A potential advantage of the present invention is, therefore, in that it provides a cost-effective and low-maintenance solution for growing trees and/or other relatively large plants in the vicinity of built-up hardscape, while providing for suitable soil growth conditions, plant root management, ready access for maintenance, and effective water drainage.

In some embodiments, the present invention provides for a rigid plant growth enclosure which may provide a below-surface growth space for one or more plants. In some embodiments, the rigid plant growth enclosure may be structurally configured for providing sufficient structural support to any hardscape located above and around the enclosure, while allowing for adequate internal growth space, which may contain soil of a composition and/or compactness suitable for growing plants.

In some embodiments, the present invention may provide for a shared rigid enclosure growth space for a plurality of plants. In some embodiments, the present invention may provide for a modular plant growth system comprising a plurality of interconnecting plant growth enclosures and similar sections. In some embodiments, each section of a modular plant growth system of the present invention may comprise an elongated body having a longitudinal through passageway and configured for interconnecting with one or more other sections of the modular system. In some embodiments, such section of the system may be of a circular, oval, horseshoe shape, octagonal, rectangular, or another cross-sectional shape. In some embodiments, the sections of the system may come is a variety of lengths and/or cross-sectional area sizes, to accommodate different sizes of trees or other plants and various deployment locations. In some embodiments, some of these sections may be curved along a longitudinal axis thereof. In some variations, some of these sections may be bent at one or more points, e.g., at a right, acute, and/or obtuse angle. In some embodiments, each section may be configured for interconnecting with one or more other sections, e.g., end-to-end, end-to-side, and/or side-to-side. In some embodiments, each of these interconnections may be at a right angle, a straight angle, an acute angle, and/or an obtuse angle. In some embodiments, a plurality of interconnected sections of a modular plant growth system of the present invention may be configured for deployment below surface, e.g., within dug ditches or trenches, according to a variety of layouts. In some embodiments, such layouts may comprise straight and/or curved paths, perimeter layouts, circles, rectangles, H-pattern layouts, and the like.

In some embodiments, each section of a modular plant growth system of the present invention may comprise a plurality of openings and/or perforations configured for facilitating planting, root growth management, aeration, drainage, and/or access for maintenance. In some embodiments, the sections may come in a variety of configurations based on specified combinations of these openings and/or perforations, to serve different functions within the modular plant growth system of the present invention. For example, one such configuration may comprise a section intended for receiving and growing one or more trees or other plants. Another configuration may comprise an extension section, configured for interconnecting to a plant-receiving section and serving, e.g., to extend an internal growth space and/or provide for maintenance access to the system. In yet another example, some sections may combine both of these functions in a single section.

In some embodiments, each section may be configured for providing an enclosed, structurally rigid growth space, which can be deployed below surface, in a dug trench, and be capable of supporting hardscape above and around, as well as any foot and vehicular traffic thereon. In some embodiments, parts or all of each section may be constructed so as to be capable of supporting an overall load of at least 10 tons. In some embodiments, each section may be constructed of any suitable material, such as a polymer (e.g., polyethylene, polypropylene, and/or any other type of polyolefins), metal (cast iron, black iron, steel, etc.), concrete, and/or any combination thereof.

In some embodiments, some or all of the sections may partially or wholly employ a corrugated or similar ribbed or ridged construction, which may provide the benefits of durability, high strength-to-weight ratio, and cost-effectiveness. In other variations, the material itself, e.g., concrete, may provide the necessary structural strength and rigidity to each section.

Figure 2A:
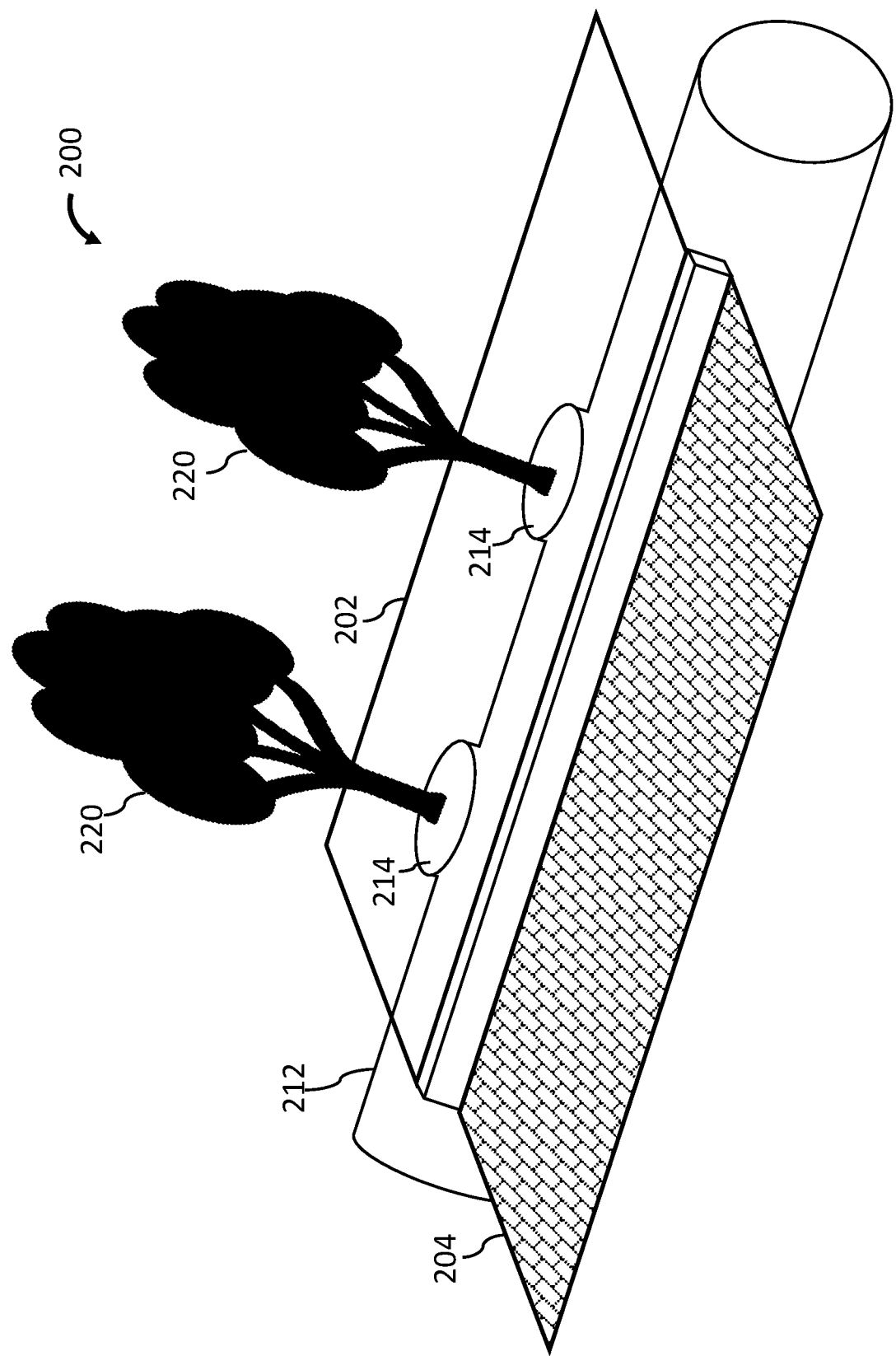
FIG. 2A is a perspective elevation view, partly in cross-section, of an exemplary system for plant growth management, according to an embodiment.
Figure 2B:
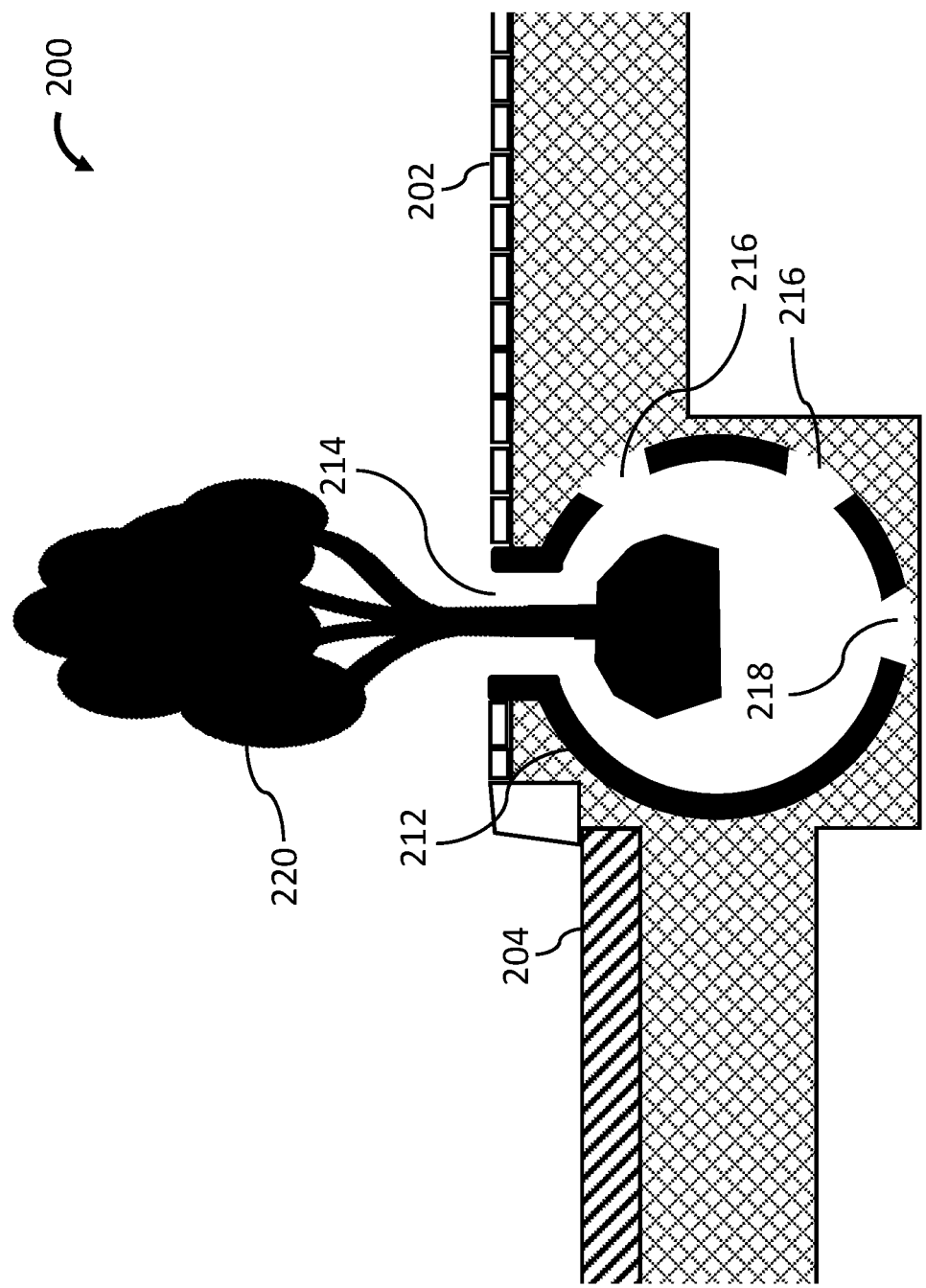
FIG. 2B is a cross-sectional view of the system of FIG. 2A.

FIGS. 2A and 2B schematically illustrate, respectively, a perspective elevation view and a side cross-sectional view of an exemplary system 200 deployed in an urban hardscape, according to an embodiment. In this embodiment, system 200 comprises a cylindrical continuous growth space comprising, e.g., one or more plant growth sections 212, which may be interconnected. System 200 may be positioned below surface, e.g., within trench dug below curb 202 and adjacent roadway 204. Sections 212 may be configured for providing sufficient soil volumes for supporting the growing of trees 220, which are planted through openings 214. In some embodiments, system 200 may be a part of a larger continuous plant growth system comprising a plurality of sections.

In some embodiments, a plurality of side openings, such as openings 216 (shown in FIG. 2B), may be configured for providing outlets for the roots of trees 220. Opening 216 may be positioned so as to control and direct root growth, e.g., substantially horizontally, to minimize potential damage to the surrounding hardscape due to, e.g., buckling. Opening 218 at the bottom of section 212 may be configured for providing water drainage for system 200.

Figure 3A:
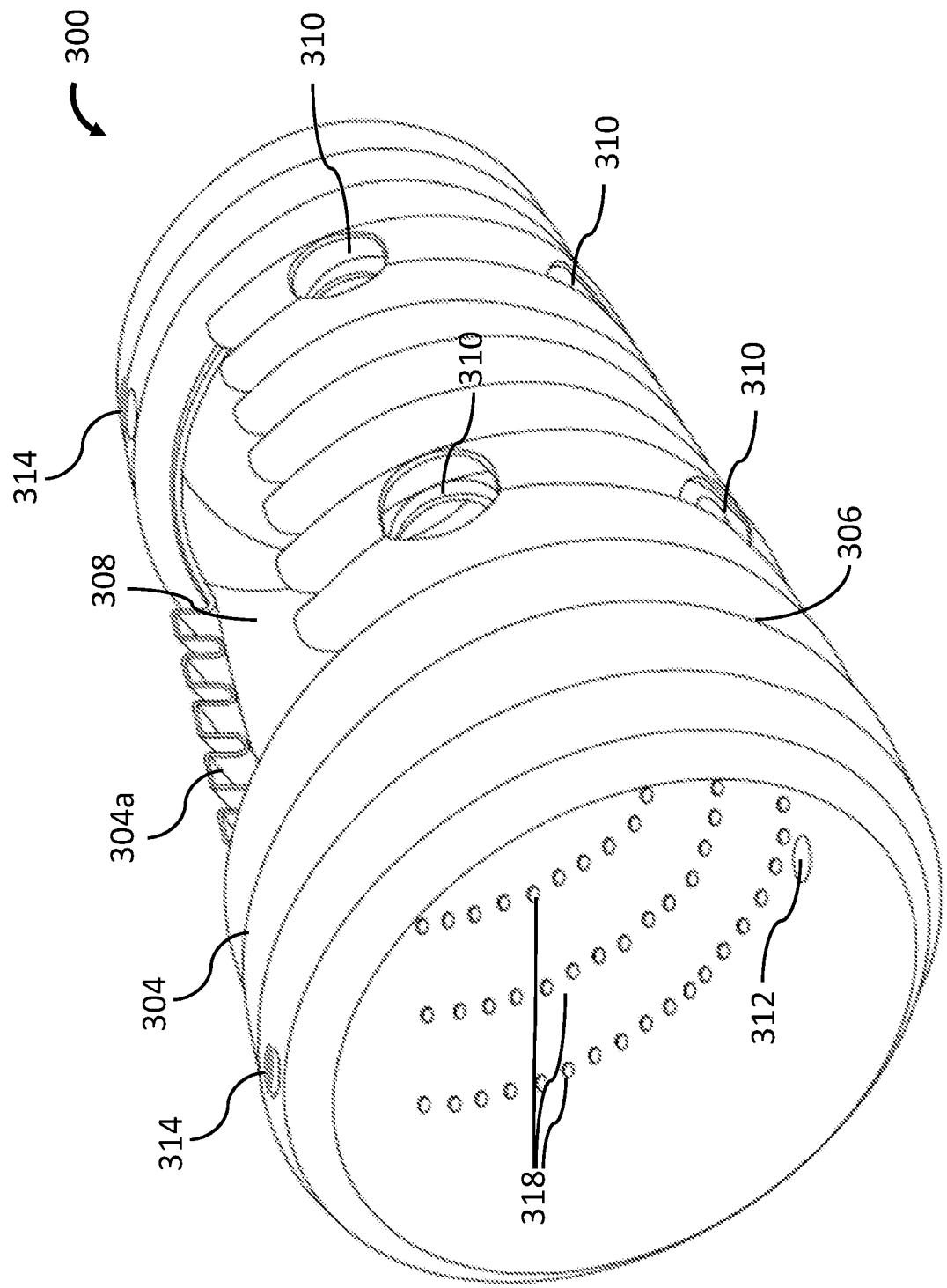
FIG. 3A is a perspective view of a section of a system for plant growth management, according to an embodiment.
Figure 3B:
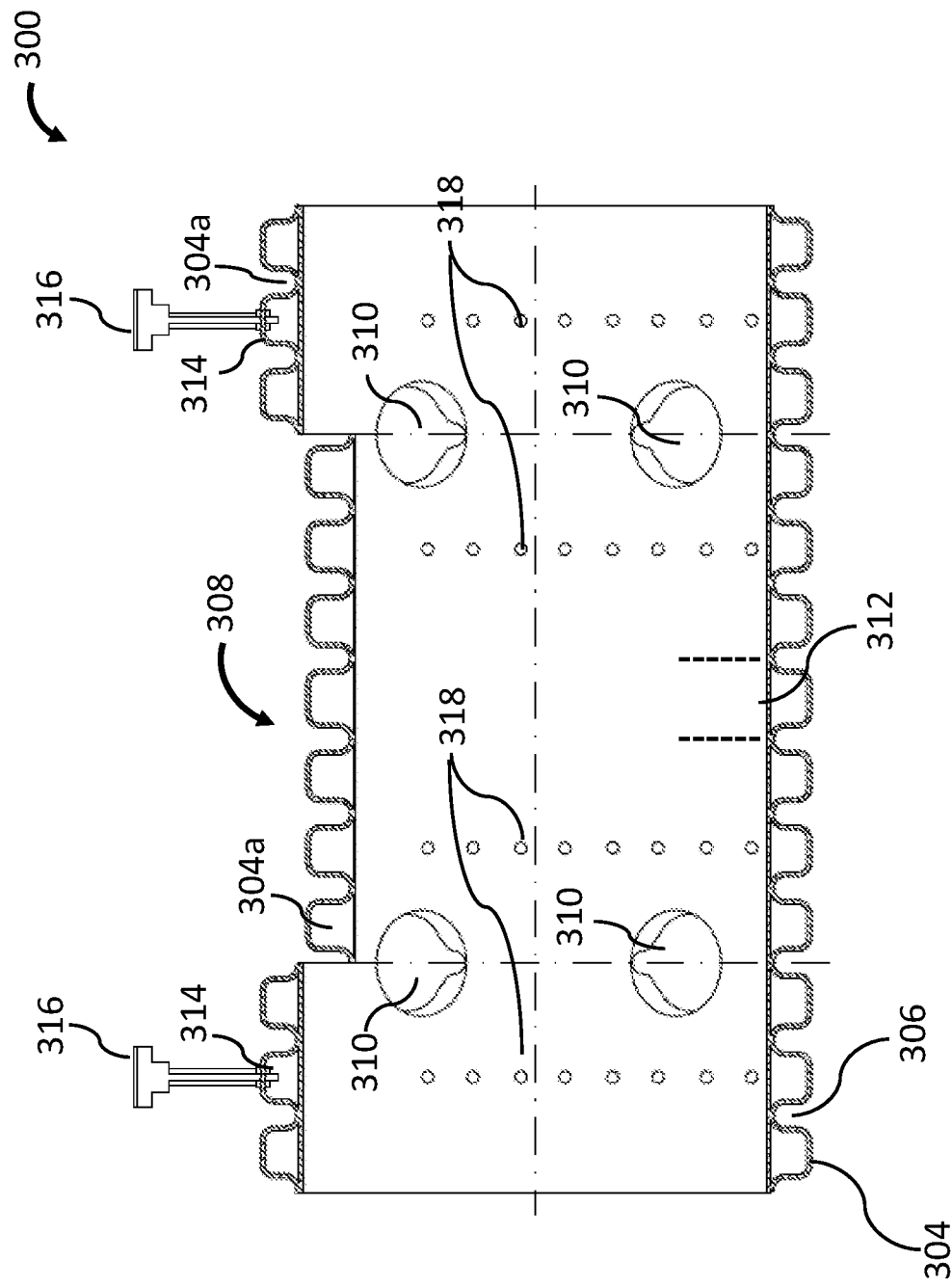
FIG. 3B is a cross-sectional lengthwise view of the section of FIG. 3A.

FIGS. 3A and 3B illustrate, respectively, a perspective view and a cross-sectional lengthwise view of an exemplary plant growth section 300 of the present invention. In some embodiments, section 300 may be used as part of a larger modular plant growth system, such as system 200 of FIGS. 2A and 2B. Section 300 in this embodiment is structured as a rigid, double-walled cylindrical corrugated pipe, having a length of between, e.g., 100 cm and 800 cm and an inner diameter of between 50 cm and 300 cm. In some embodiments, other types of pipes and/or similar elongated hollow bodies of varying shapes may be used, having, e.g., oval, octagonal, rectangular, horseshoe shape, or other cross-sectional profiles. Where the cross-sectional profile of the elongated body is other than circular, a cross-sectional perimeter of the elongated body will be dimensioned such that a maximal inscribed circle within said cross-sectional perimeter has a diameter of between 50 cm and 300 cm.

In the embodiment shown in FIGS. 3A and 3B, section 300 comprises a corrugated-type pipe construction having an inner wall defining a cylindrical hollow passageway, and a corrugated outer wall having successive spaced-apart annular ribs 304 and valleys 306. In some embodiments, ribs 304 may be formed, e.g., annularly and/or helically around section 300. In some embodiments, each of ribs 304 may define an annular, hollow channel 304a formed interiorly between the inner and outer walls of section 300. In some embodiments, ribs 304 may be configured for increasing the structural rigidity and strength of section 300.

The structural form of section 300 shown in FIGS. 3A and 3B is an exemplary embodiment only, and in some variations, section 300 may comprise different structural designs, such as a corrugated and/or non-corrugated single-layer construction; different and/or additional strengthening structural elements, such as ribbing, ridging, and/or similar features; and/or different materials used for constructing various portions of section 300.

With continued reference to FIGS. 3A and 3B, section 300 may comprise one or more through openings located about a longitudinal upper half of section 300, such as opening 308. For example, in some embodiments, an opening 308 may be located centrally relative to the longitudinal and/or transverse dimensions of section 300. In other embodiments, opening 308 may be moved along the longitudinal dimension of section 300, and/or be offset to one side relative to a longitudinal center line of section 300.

In some embodiments, opening 308 may be of various perimeter shapes, such as circular, oval, rectangular, or another shape. In some variations, section 300 may comprise more than one opening 308, potentially of varying shapes and sizes, depending, e.g., on an overall length of section 300 and its intended function within system 200.

In some embodiments, opening 308 may be dimensioned for receiving, e.g., a root ball of a tree or another large plant therethrough. In some embodiments, each opening 308 has a diameter of between 20 and 160 cm. In some embodiments, a total opening area of each opening 308 may be between, e.g., approximately 300 and 20000 cm$^2$. In some embodiments, in order to maintain sufficient overall rigidity of section 300, a lengthwise dimension of opening 308 may be confined to no more than the longitudinal middle third of section 300.

Figure 3C:
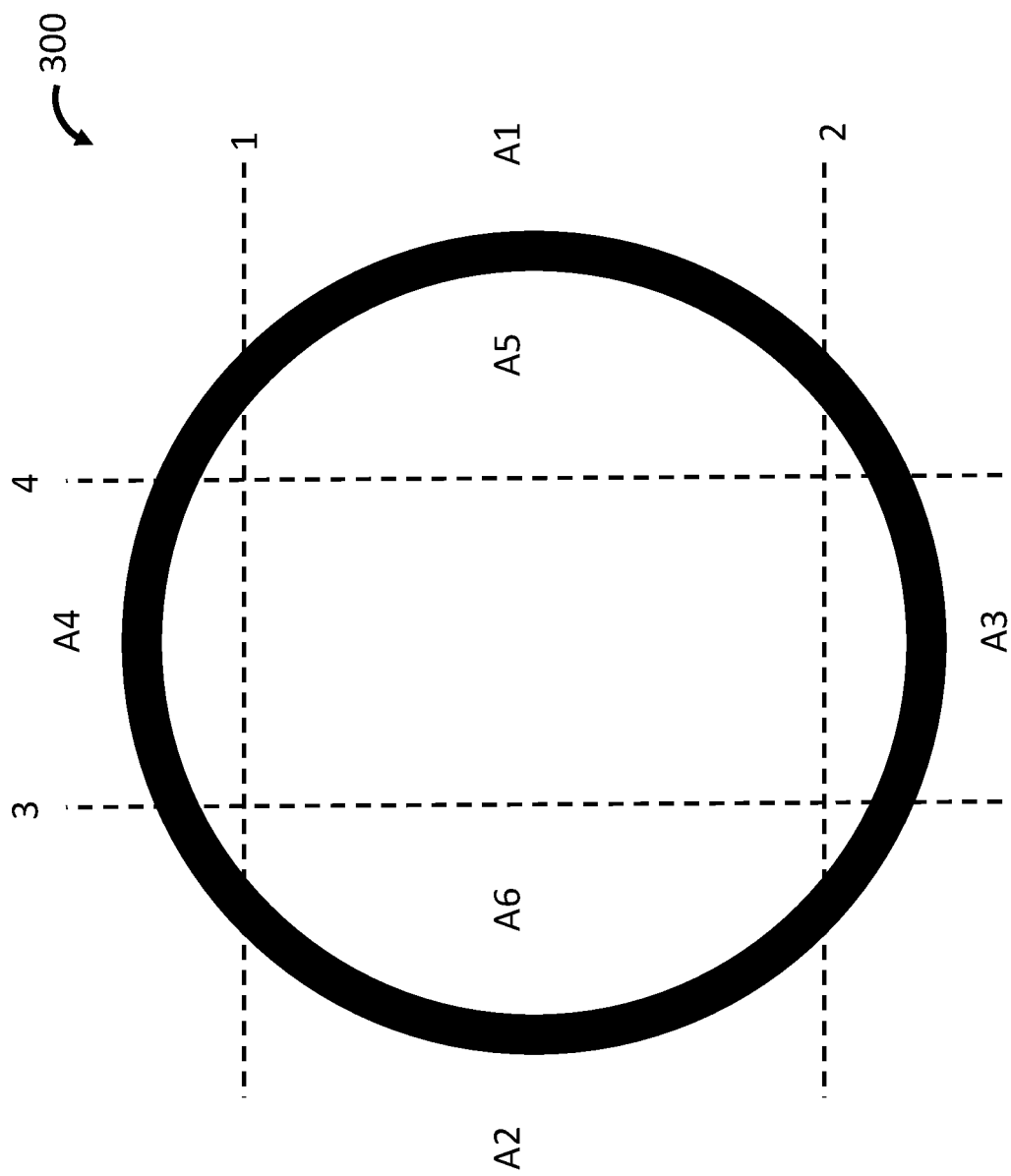
FIG. 3C is a schematic cross-sectional front view the section of FIG. 3A.

In some embodiments, section 300 may further comprise at least two through root openings 310. In some embodiments, root openings 310 may be of various perimeter shapes, such as circular, oval, rectangular, or another shape. In the circular version, root openings 310 may each have a diameter of between 5 and 30 cm. In other variations, root openings 310 may each have a total opening area of between approximately 20 and 700 cm$^2$. With reference to FIG. 3C, which illustrates a schematic cross-sectional front view of section 300, root openings 310 may be disposed about longitudinal side zones A1 and/or A2, defined by horizontal planes 1, 2 intersecting the circumference of section 300 approximately between 11:00 and 1:00 o'clock and 5:00 and 7:00 o'clock, respectively.

In some embodiments, root openings 310 may be configured for providing an outlet for roots of a tree or plant growing within section 300, so as to direct the roots towards a desired growth path that would not interfere with the surrounding hardscape. For example, in the embodiment shown in FIGS. 2A and 2B, root openings 310 (referenced as numerals 216 in FIGS. 2A and 2B) may be located so as to direct the roots of tree 220 to one side only, i.e., away from roadway 204 and towards the area underneath curb 202. In other embodiments, root openings 310 may be configured for directing the roots in either or both sides, and in various angles relative to a horizontal plane.

In some variations, section 300 may comprise more than two root openings 310, potentially of varying shapes and sizes, depending, e.g., on an overall length of section 300 and its intended function within system 200. For example, section 300 may comprise between 3 and 10 root openings 310, arranged in a variety of layouts within zones A1 and/or A2, e.g., in different heights within zones A1, A2, and/or in pairs along longitudinal rows, as shown in FIGS. 3A and 3B. In some embodiments, the root openings 310 may be spaced between 40 cm and 120 cm center-to-center. In other variations, section 300 may be configured such that root openings 310 located in an upper row of openings may have an opening area smaller than that of root opening 310 located in a lower row.

In some embodiments, a different number of root openings 310 may be arranged in various desired patterns about zones A1 and/or A2, to accommodate trees or plants of various types and growth patterns. In some embodiments, root openings 310 may be disposed on either or both side zones of section 300, depending, e.g., on its intended deployment location and orientation relative to surrounding hardscape.

With continued reference to FIGS. 3A-3C, in some embodiments, at least one through drainage opening 312. Drainage opening 312 may be disposed about a longitudinal bottom zone A3 of section 300 (shown in FIG. 3C), defined by two vertical planes 3, 4 intersecting the circumference of section 300 approximately between 11:30 and 6:30 o'clock and 12:30 and 5:30 o'clock, respectively.

In some embodiments, drainage opening 312 may be circular and have a radius of between 5 and 25 cm. In other embodiments, opening 312 may have an opening area of between 80 cm$^2$ and 500 cm$^2$. In some embodiments, opening 312 may be configured for permitting water egress from section 300.

In some embodiments, drainage opening 312 may be of various perimeter shapes, such as circular, oval, rectangular, or another shape. In some variations, section 300 may comprise more than one drainage openings 312, potentially of varying shapes and sizes, depending, e.g., on an overall length of section 300 and its intended function within system 200.

With continued reference to FIGS. 3A-3C, in some embodiments, at least one aeration opening 314 may be disposed about a longitudinal upper zone A4 of section 300 (shown in FIG. 3C), defined by vertical planes 3, 4.

In a variation illustrated in FIGS. 3A and 3B, section 300 may be configured for providing aeration of the interior of section 300 through, e.g., an aeration system comprising aeration openings 314, aeration shafts 316, and hollow channels 304a. In some embodiments, aeration openings 314 may each have an opening area of between 1 and 12 cm$^2$ and are configured for receiving, e.g., aeration shafts 316 shown in FIG. 3B, for introducing atmospheric air into the interior of section 300.

For example, an aeration opening 314 may be positioned about a crown of an annular rib 304, so as to penetrate only the outer wall of rib 304, such that atmospheric air may be introduced into its corresponding hollow channel 304a. In some embodiments, depending on a below-surface depth of deployment of section 300, aeration shafts 316 may be configured for extending to at least surface level, to provide air communication between the ambient atmosphere and aeration opening 314. In some embodiments, as can be seen in FIGS. 3A-3B, atmospheric air may also be introduced into open ends of ribs 304, where a top segment of section 300 was removed to create an opening 308.

In some embodiments, the aeration system may further comprise a plurality of perforations located about the inner wall of section 300. In some embodiments, these perforations may be arranged in partly-circumferential rows 318 which may coincide with one or more ribs 304. Accordingly, each perforation row 316 may provide air flow communication between a corresponding hollow channel 304a of the rib and the internal space of section 300, thereby completing the aeration system.

In some embodiments, each perforation may have an area of between 1 and 5 cm$^2$. In some embodiments, perforation rows 318 may comprise a plurality of perforations spaced in the circumferential dimension between 1 and 4 cm center-to-center. In some embodiments, with reference to FIG. 3C, perforation rows 318 may be located internally within either or both inner side zones A5, A6, which correspond to outer side zones A1, A2, respectively.

In some embodiments, section 300 may be configured such that a ratio between a radius of opening 308 and a radius of openings 310 may be between 1.5:1 and 4:1. In some embodiments, section 300 may be configured such that the total area of all openings and perforations therein is equal to between 6% and 25% of the total surface area of the inner wall of section 300.

Figure 3D:
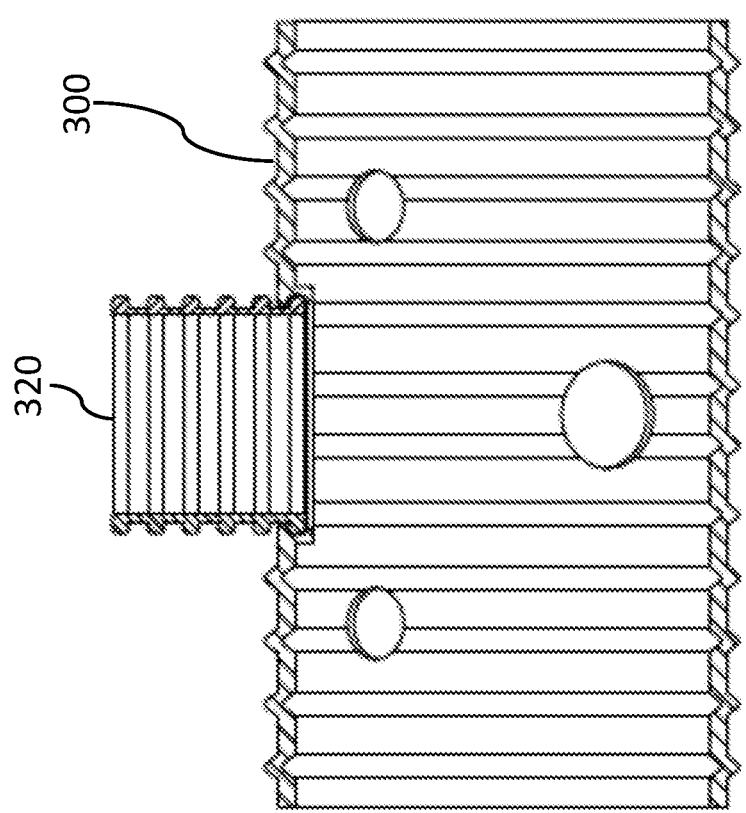
FIG. 3D illustrates a planting extension for a section of a system for plant growth management, according to an embodiment.

With reference to FIG. 3D, in some embodiments, section 300 may comprise a planting extension 320 configured for extending, e.g., from opening 308 to surface level. Planting extension 320 may be configured for providing surface-level access into system 200, e.g., for maintenance, nourishing, and/or watering. In addition, planting extension 320 may be configured for providing an anchoring of section 300 within its deployment location against, e.g., rotational and/or axial displacement. In some embodiments, planting extension 320 may be configured for extending between 5 and 60 cm above a top point of section 300. In some embodiments, planting extension 320 may be rigidly connected to section 300, while in other variations planting extension 320 may be a removable planting extension.

Figure 4A:
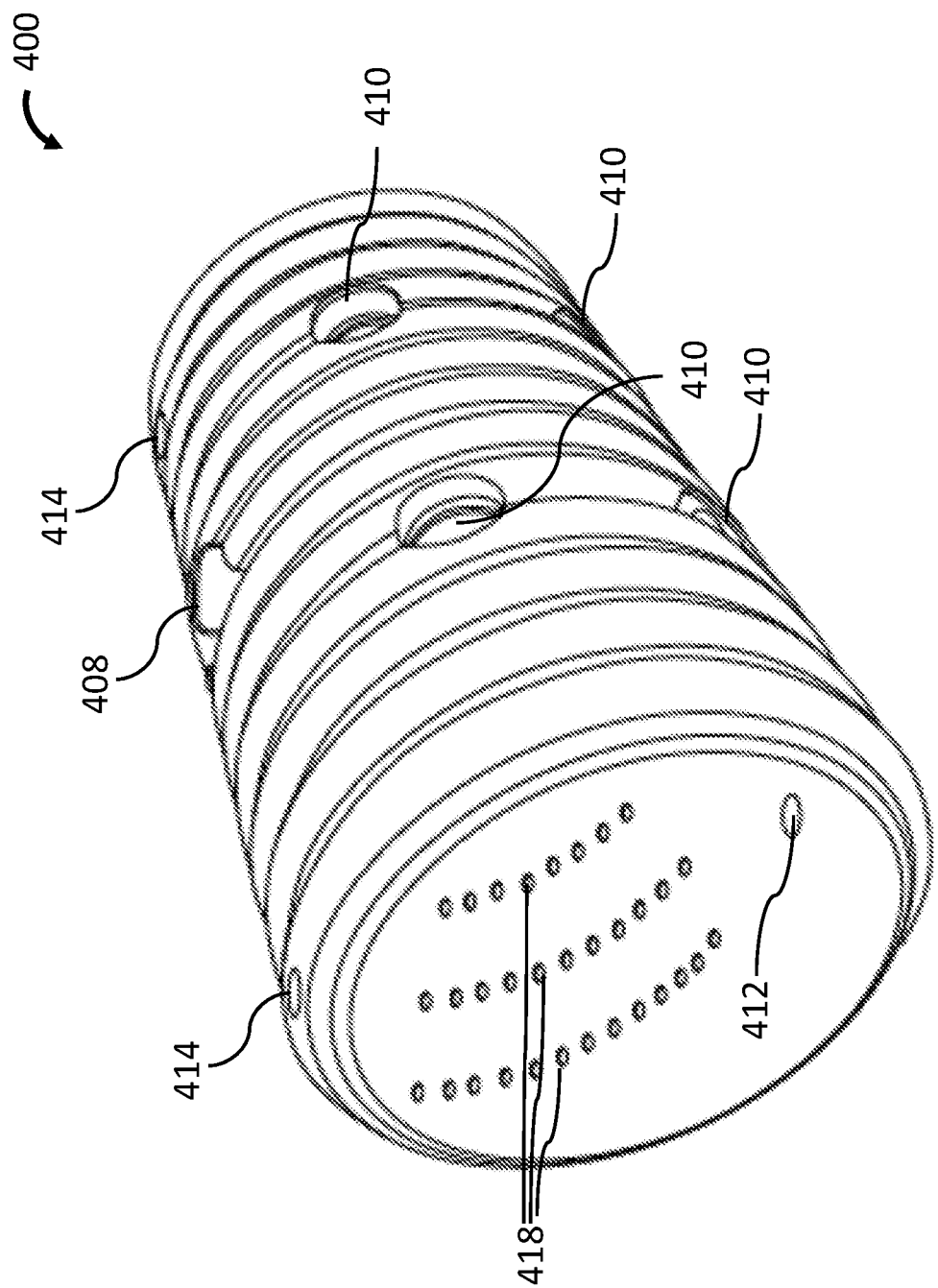
FIG. 4A is a perspective view of a second exemplary section of a system for plant growth management, according to an embodiment.
Figure 4B:
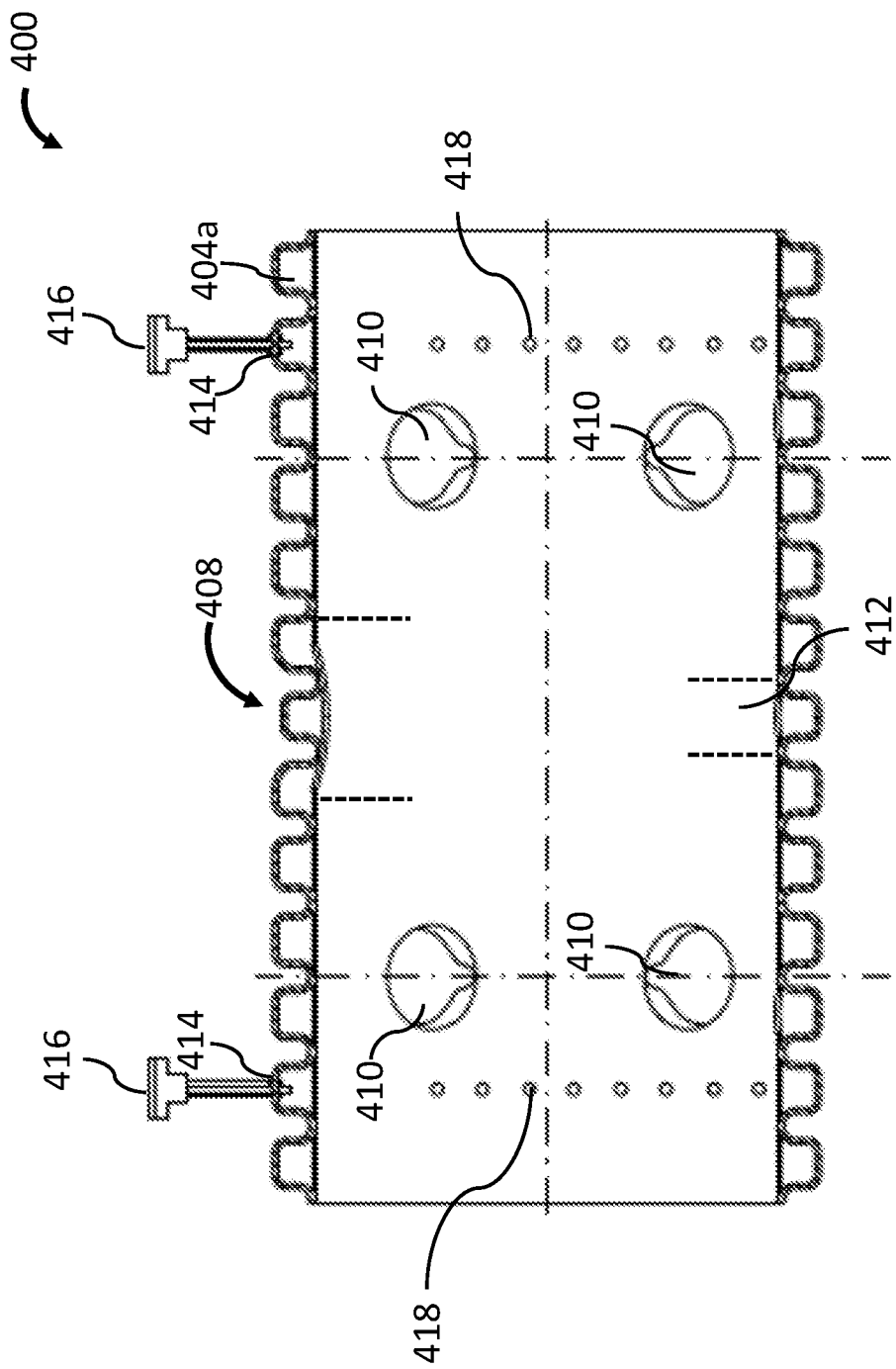
FIG. 4B is a cross-sectional lengthwise view of the section of FIG. 4A.

An exemplary embodiment of another configuration of a plant growth section 400 of the present invention is illustrated in FIGS. 4A and 4B, respectively, in a perspective view and a cross-sectional lengthwise view. In this variation, section 400 may be configured for serving, e.g., as an extension section to section 300 shown in FIGS. 3A and 3B.

In some embodiments, section 400 may be of like construction and made of like materials as section 300.

In some embodiments, section 400 may comprise a similar layout of the various openings and perforations to that of section 300, with relevant modifications. For example, in some embodiments, section 400 may comprise a through maintenance opening 408 located about a longitudinal upper half of section 400, similarly to opening 308 in FIGS. 3A-3B. Opening 408 may have an opening area similar to, or smaller than, that of opening 308, and may provide for watering and/or maintenance access into portions of system 200. In some embodiments, opening 408 may be of various shapes, such as circular, oval, rectangular, or another shape.

In addition, in some embodiments, section 400 may further comprise one or more of:

root openings 410, of similar dimensions and similar positioning to that of root openings 310 of section 300;

drainage openings 412, of similar dimensions and similar positioning to that of drainage openings 312 of section 300;

aeration openings 414 of similar dimensions and similar positioning to that of aeration openings 316 of section 300; and/or perforation rows 416 of similar dimensions and similar positioning to that of perforation rows 318 of section 300.

In some embodiments, section 400 may be configured such that the total area of all openings and perforations therein may be equal to between 8% and 20% of the total surface area of the inner wall of section 400.

Figure 5:
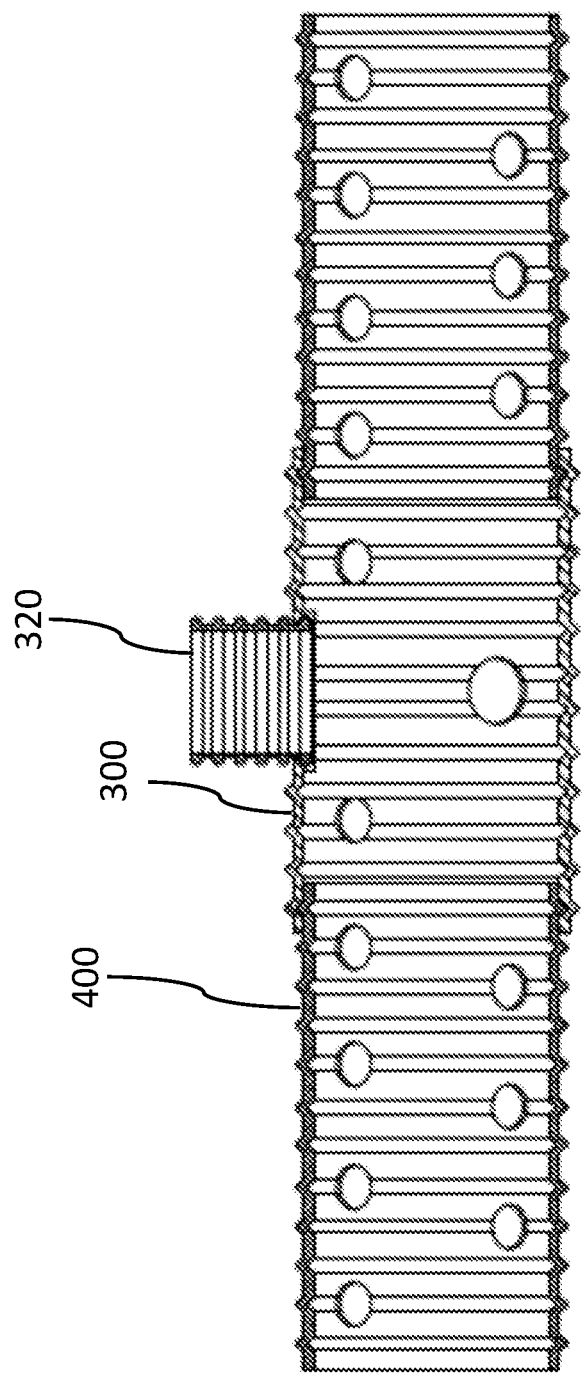
FIG. 5 illustrates interconnected sections of a system for plant growth management, according to an embodiment.

FIG. 5 is a schematic illustration of at two interconnected sections, e.g., sections 300 and 400, of a system for plant growth management according to an embodiment. In some embodiments, section 300 may be coupled end-to-end to, e.g., an extension section 400 of a smaller diameter, such that section 400 may be inserted into an end portion of section 300. In other embodiments, other means of coupling of two or more section may be considered, including through an outer coupling sleeve, and/or other methods. As noted above, in some embodiments, sections 300 and 400 may be configured for interconnecting with one another and/or additional sections, e.g., end-to-end, end-to-side, and/or side-to-side, at a right angle, a straight angle, an acute angle, and/or an obtuse angle.

Figure 6:
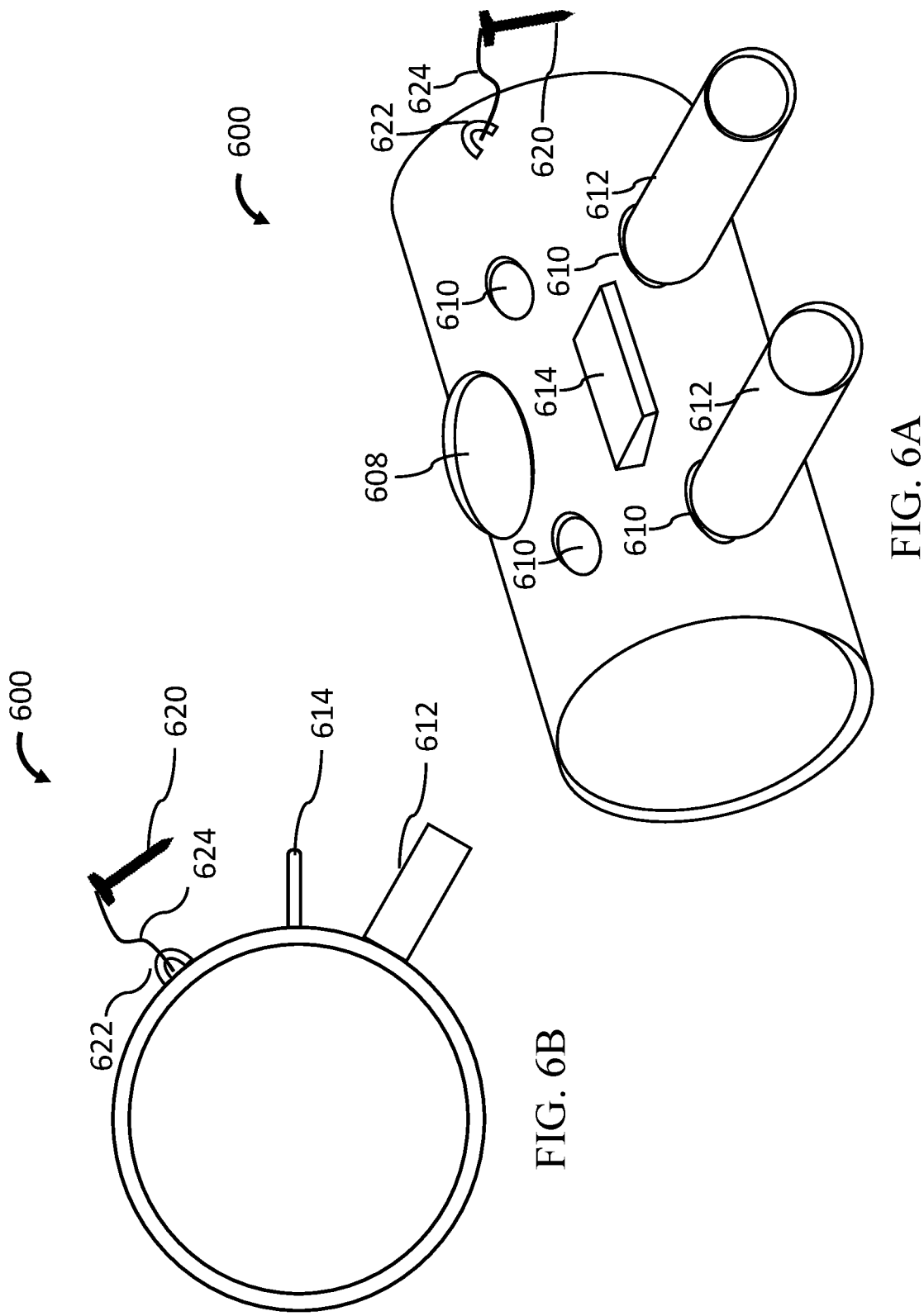
FIGS. 6A-6B illustrate additional embodiments of a section of a system for plant growth management.

FIGS. 6A and 6B illustrates, respectively, a perspective view and a cross-sectional front view of an exemplary plant growth section 600 of the present invention. Section 600, in some embodiments, may employ one or more anchoring and/or stabilizing means to prevent rotational and/or axial displacement of section 600, due, e.g., to high winds which may sway a plant or tree planted within section 600. For example, section 600 may be configured for anchoring into the ground and/or surrounding hardscape, e.g., by means of a stake 620 which is connected to eye hook 622 via, e.g., cable 624. In other embodiments, section 600 may comprise one or more stabilizer fins 614 configured for gaining purchase into the surrounding ground so as to resist rotational and/or axial displacement of section 600. In yet other embodiments, section 600 may comprise one or more extension conduits 612, configured for rigidly connecting, e.g., via a threaded and/or friction connection, to corresponding root openings 610. In some embodiments, extension conduits 612 may extend into the surrounding ground so as to resist rotational and/or axial displacement of section 600.

Figure 7:
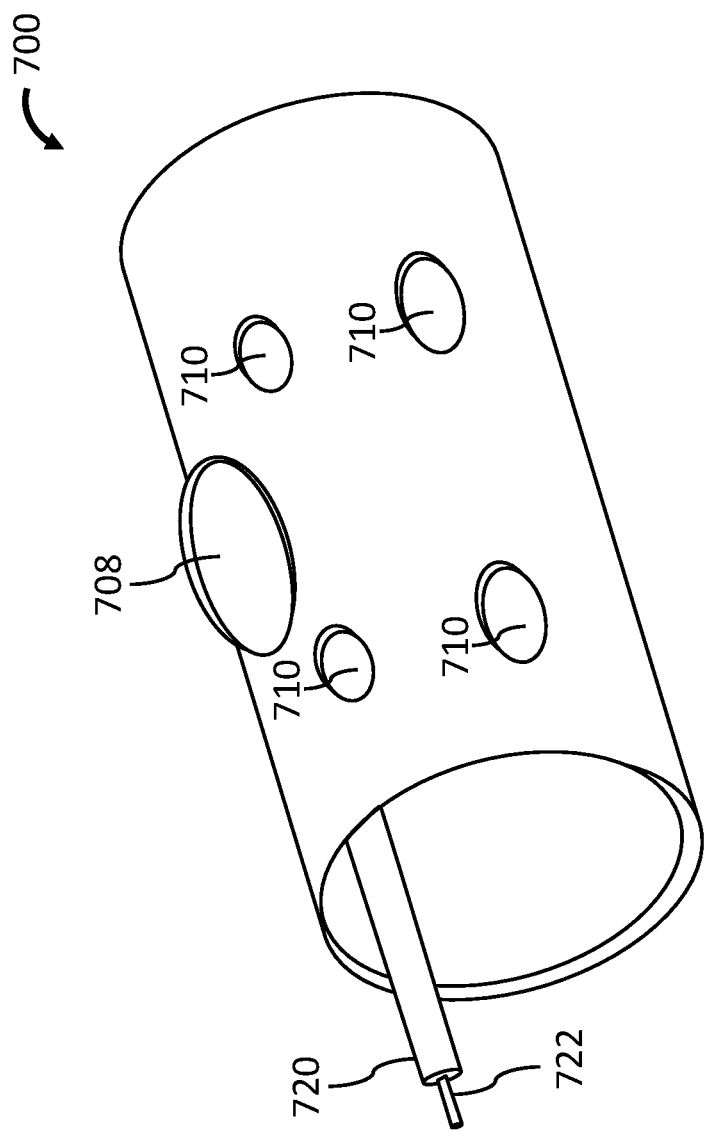
FIG. 7 illustrates an irrigation element for a section of a system for plant growth management, according to an embodiment.

FIG. 7 illustrates an exemplary embodiments of a plant growth section 700 of the present invention further comprising an optional irrigation conduit 720 disposed internally along the length of section 700. Irrigation conduit 720 may be configured for providing a conduit for an irrigation element, such as a drip irrigation element 722. Irrigation conduit 720 may advantageously comprise a layer of geotextile fabric disposed along its length, so as to prevent clogging of the irrigation element. In some embodiments, irrigation conduit 720 is configured for placing in an upper internal area of plant growth section 700, so as to irrigate soil within section 700 from above.

It will be appreciated that all the above description and examples have been given for the purpose of illustration and are not intended to limit the invention in any way. The terms, "for example," "e.g.," "optionally," as used herein, are intended to be used to introduce non-limiting examples. While certain references are made to certain example components, other components can be used as well and/or the example components can be combined into fewer components and/or divided into further components. In the description and claims of the application, each of the words "comprise" "include" and "have," and forms thereof, are not necessarily limited to members in a list with which the words may be associated. In addition, where there are inconsistencies between this application and any document incorporated by reference, it is hereby intended that the present application controls.

What is claimed is:

1. A system comprising an elongated body defining a hollow passageway therethrough, said elongated body having (i) a length of between 100 and 800 cm, and (ii) a cross-sectional perimeter dimensioned such that a maximal inscribed circle within said cross-sectional perimeter has a diameter of between 50 and 300 cm, wherein said elongated body comprises:
   a first opening disposed about a longitudinal upper half of said elongated body, wherein said first opening has an area of between 300 and 20000 cm2; and
   at least two second openings disposed about at least one of:
      (a) a first longitudinal side zone of said elongated body which extend clockwise from about the 1-o'clock position to about the 5-o'clock position on said inscribed circle, and
      (b) a second longitudinal side zone of said elongated body which extends clockwise from about the 7-o'clock position to the 11-o'clock position on said inscribed circle,
   wherein each of said at least two second opening has an area of between 20 and 700 $cm^2$.

2. The system of claim 1, wherein said elongated body comprises two or more said first openings disposed about said longitudinal upper half of said elongated body, and wherein said two or more first openings are spaced at least 300 cm center-to-center.

3. The system of claim 1, further comprising a planting extension comprising a hollow conduit configured for coupling to said first opening and extending perpendicularly from a top surface of said elongated body, wherein said planting extension has a length of between 5 and 60 cm.

4. The system of claim 1, wherein said elongated body comprises between 3 and 10 said second openings arranged about at least one of said first and second longitudinal side zones.

5. The system of claim 1, wherein said elongated body further comprises at least one third opening disposed about a longitudinal bottom zone of said elongated body which extends clockwise from about the 5:30-o'clock position to about the 6:30-o'clock position on said inscribed circle, wherein said at least one third opening has an area of between 80 and 500 $cm^2$.

6. The system of claim 1, wherein said elongated body further comprises at least one fourth opening disposed about a longitudinal top zone of said elongated body which extends clockwise from about the 11:30-o'clock position to about the 12:30-o'clock position on said inscribed circle, wherein said at least one fourth opening has an area of between 1 and 12 $cm^2$.

7. The system of claim 1, further comprising two or more said elongated bodies, wherein said elongated bodies are configured for coupling to one another in a configuration selected from the group consisting of: straight line, a curved line, a circle, a rectangle, a T-junction, an L-junction, and an H-pattern.

8. The system of claim 1, wherein said elongated body comprises a corrugated construction comprising an inner wall and an outer wall, wherein said outer wall defines a plurality of successive spaced-apart annular ribs with annular valley-defining portions between each pair of said annular ribs, and wherein each of said annular ribs defines a corresponding annular hollow channel formed interiorly thereof.

9. The system of claim 8, wherein the elongated body further comprises a plurality of perforations extending axially and circumferentially about the inner wall of said elongated body, and wherein each of said plurality of perforations penetrates said inner wall of the elongated body to enable air communication between an interior of said elongated body and one of said annular hollar channels.

10. The system of claim 1, wherein each of said fourth openings is disposed about a crown of one of said plurality of annular ribs to provide air communication between said corresponding annular hollow channel and the ambient atmosphere.

11. A method for tree-growth management, the method comprising the steps of:
   providing a system comprising an elongated body defining a hollow passageway therethrough, said elongated body having (i) a length of between 100 and 800 cm, and (ii) a cross-sectional perimeter dimensioned such that a maximal inscribed circle within said cross-sectional perimeter has a diameter of between 50 and 300 cm, wherein said elongated body comprises:
   a first opening disposed about a longitudinal upper half of said elongated body, wherein said first opening has an area of between 300 and 20000 $cm^2$; and
   at least two second openings disposed about at least one of:
      (a) a first longitudinal side zone of said elongated body which extend clockwise from about the 1-o'clock position to about the 5-o'clock position on said inscribed circle, and
      (b) a second longitudinal side zone of said elongated body which extends clockwise from about the 7-o'clock position to the 11-o'clock position on said inscribed circle,
   wherein each of said at least two second opening has an area of between 20 and 700 $cm^2$;
   deploying said elongated body below surface such that said first opening is oriented substantially upwards; and
   planting a plant through said first opening.

12. The method of claim 11, wherein said elongated body comprises two or more said first openings disposed about said longitudinal upper half of said elongated body, and wherein said two or more first openings are spaced at least 300 cm center-to-center.

13. The method of claim 11, further comprising a planting extension comprising a hollow conduit configured for coupling to said first opening and extending perpendicularly from a top surface of said elongated body, wherein said planting extension has a length of between 5 and 60 cm.

14. The method of claim 13, wherein said deploying comprises (i) deploying said elongated body such that (a) said first opening is oriented substantially upwards, and (b) an upper end of said planting extension is substantially at surface level; and (ii) said planting comprises planting a plant through said planting extension.

15. The method of claim 11, wherein said elongated body further comprises at least one third opening disposed about a longitudinal bottom zone of said elongated body which extends clockwise from about the 5:30-o'clock position to about the 6:30-o'clock position on said inscribed circle, wherein said at least one third opening has an area of between 80 and 500 $cm^2$.

16. The method of claim 11, wherein said elongated body further comprises at least one fourth opening disposed about a longitudinal top zone of said elongated body which extends clockwise from about the 11:30-o'clock position to about the 12:30-o'clock position on said inscribed circle, wherein said at least one fourth opening has an area of between 1 and 12 $cm^2$.

17. The method of claim 11, wherein said system comprises two or more said elongated bodies, wherein said elongated bodies are configured for coupling to one another in a configuration selected from the group consisting of: straight line, a curved line, a circle, a rectangle, a T-junction, an L-junction, and an H-pattern.

18. The method of claim 10, wherein said elongated body comprises a corrugated construction comprising an inner wall and an outer wall, wherein said outer wall defines a plurality of successive spaced-apart annular ribs with annular valley-defining portions between each pair of said annular ribs, and wherein each of said annular ribs defines a corresponding annular hollow channel formed interiorly thereof.

19. The method of claim 18, wherein the elongated body further comprises a plurality of perforations extending axially and circumferentially about the inner wall of said elongated body, and wherein each of said plurality of perforations penetrates said inner wall of the elongated body to enable air communication between an interior of said elongated body and one of said annular hollow channels.

20. The method of claim 18, wherein each of said fourth openings is disposed about a crown of one of said plurality of annular ribs to provide air communication between said corresponding annular hollow channel and the ambient atmosphere.

\* \* \* \* \*